(12) United States Patent
Greiwe

(10) Patent No.: US 6,199,472 B1
(45) Date of Patent: Mar. 13, 2001

(54) BEVERAGE PREPARER, IN PARTICULAR COFFEE MACHINE

(75) Inventor: Hansdieter Greiwe, Boxberg (DE)

(73) Assignee: Palux AG, Bad Mergentheim (DE)

(*) Notice: Subject to any disclaimer, the term of this patent is extended or adjusted under 35 U.S.C. 154(b) by 0 days.

(21) Appl. No.: 09/386,981

(22) Filed: Aug. 31, 1999

(30) Foreign Application Priority Data

Sep. 11, 1998 (DE) .............................................. 198 41 680

(51) Int. Cl.[7] .................................................. A47J 31/34
(52) U.S. Cl. .............................. 99/291; 99/293; 99/290; 99/299; 99/302 R
(58) Field of Search ............................. 99/293, 291, 290, 99/299, 302 R, 307

(56) References Cited

U.S. PATENT DOCUMENTS

| | | | |
|---|---|---|---|
| 4,484,515 | * | 11/1984 | Illy ...................................... 99/299 X |
| 4,757,754 | * | 7/1988 | Welker ................................ 99/291 X |
| 5,186,096 | * | 2/1993 | Willi .................................... 99/299 X |
| 5,259,297 | * | 11/1993 | Giuliano .......................... 99/302 R X |
| 5,598,764 | * | 2/1997 | Bambi ............................. 99/302 R X |
| 5,813,318 | * | 9/1998 | Zanin et al. ............................ 99/291 |

FOREIGN PATENT DOCUMENTS

| | | |
|---|---|---|
| 31 33 903 C1 | 11/1982 | (DE) . |
| 33 16 158 A1 | 11/1984 | (DE) . |
| 33 16 158 C2 | 11/1984 | (DE) . |

* cited by examiner

Primary Examiner—Reginald L. Alexander

(57) ABSTRACT

The invention relates to a beverage preparer (11), in particular a coffee machine, with a first beverage region for the preparation of first and second beverages, with a second beverage region for the preparation of third beverages, and with a pressure-raising stage (M11) to generate a first liquid pressure, such that in a first operating mode in the first beverage region the first beverages, in particular pressurized coffee, can be prepared at the first liquid pressure and such that in a second operating mode in the first beverage region second beverages, in particular brewed coffee, can be prepared at a second, lower liquid pressure. The pressure-raising stage (M11) on its output side is connected to the input (I2) of the second beverage region by way of a pressure reducer (D11). The input (I2) of the second beverage region comprises a pipe connection to an input (I1) of the first beverage region that can be blocked by an operating-mode switch apparatus (Y8) in such a way that, depending on the state of the operating-mode switch apparatus, in the first beverage region either the first or the second liquid pressure prevails.

5 Claims, 2 Drawing Sheets

Fig. 1 (ART OF PRIOR)

BEVERAGE PREPARER, IN PARTICULAR COFFEE MACHINE

FIELD

The invention relates to a beverage preparer.

BACKGROUND

A known method of preparing beverages, in particular coffee, involves the use of different liquid pressures for different kinds of beverages. In particular for coffee machines, it is known to prepare espresso with high liquid pressure and brewed coffee with low liquid pressure.

FIG. 1 shows a coffee machine 1 according to the state of the art. The coffee machine 1 comprises at its input side a pressure reducer D1, which places an upper limit, for example 2 bar, on the input pressure. At the output side of the pressure reducer D1 is a branch point, at which the water flowing in through the pressure reducer D1 can be directed towards a first beverage region for the preparation of coffee and/or towards a second beverage region for the preparation of hot water. In the second beverage region steam can also be produced, for example in order to heat beverages already available outside the apparatus. In the second beverage region are disposed, in sequence in the direction of flow, a nonreturn valve R3 followed by a boiler valve Y2, which can be controlled by an electronic controller E1, and finally a water boiler K in which hot water can be prepared. At the output side of the water boiler K is a hot-water valve Y4, likewise controllable by the electronic controller E1, by way of which the hot water can be released into a vessel, for example the cup shown in the figure.

In the first beverage region a pressure pump M1 is provided at the entrance. Arranged in parallel with the pressure pump M1 is a nonreturn valve R1, to limit the output-sided pressure of the pressure pump M1 to a specified maximum, in particular 8 bar. At the-output side of the pressure pump M1, in sequence in the direction of flow, are first a flow meter B4, then a nonreturn valve R2 and a water heater HW to warm the water needed for the preparation of coffee. At the output side of the heater HW are a first and a second pipe branch, both of which open into a coffee preparation unit KB. In the first pipe branch is an infusion valve Y1, which is controllable by the electronic controller E1, and a flow resistance D2 by means of which the water pressure is made lower at the output side of the second pipe branch than at the input side of the first pipe branch. The infusion valve Y1 is opened when brewed coffee is to be prepared in the coffee preparation unit KB. In this case the pressure pump M1 is turned off, so that water flows through it with no increase in the water pressure. During the preparation of brewed coffee, therefore, only the pressure prevailing in the pipeline at the input side of the coffee machine 1 is used, in particular about 2 bar.

In order to prepare espresso, cafe-creme and similar coffee under pressure, an admixture valve Y3 in the second pipe branch at the output of the water boiler HW is opened. At the same time the pressure pump M1 is operated in such a way that at its output a high liquid pressure is provided, in particular at least 8 bar. Therefore at the output of the second pipe branch, for the preparation of pressurized coffee, a high liquid pressure is available, only slightly below the liquid pressure at the output of the pressure pump M1.

In the preparation of both brewed and pressurized coffee the finished coffee is conducted into a vessel, such as a cup, at the output of the first beverage region.

As described above, the preparation of beverages with the coffee machine 1 depends on an adequate input pressure, in particular at least 2 bar. The pressure pump M1 for the preparation of pressurized coffee is also designed for a corresponding input pressure, if necessary reduced to the specified level by the pressure reducer D1. If the input pressure were lower, in some circumstances the pressure-raising action of the pressure pump M1 would not suffice to generate the required pressure in the second pipe branch and in the coffee preparation unit KB. Furthermore, the preparation of hot water in the second beverage region also depends on an adequate input pressure. The controller of the second beverage region is set to a predetermined input pressure, so that according to the selected mode of operation the right result is obtained, namely either hot water or steam.

If the pressure in the pipes of a water-supply mains system is sufficient, the coffee machine 1 can be connected directly to the water mains. However, if the available water mains do not provide sufficient pipeline pressure, it is possible to interpose external pressure-raising equipment ahead of the coffee machine 1.

FIG. 1 illustrates another case, in which the water for the preparation of beverages in the coffee machine 1 comes from a water tank 3. For this purpose an external pressure-generating apparatus 2 is provided, which by means of a feed pump M2 conveys water out of the water tank 3 and generates a specified minimal water pressure, in particular at least 2 bar, at the output of the pressure-generating apparatus 2. To regulate this minimal pressure a pressure regulator P is provided, which cooperates with the controller E2 of the pressure-generating apparatus 2. The controller E2, in addition to cooperating with the pressure regulator P, actuates a magnetic valve Y5 disposed between the water tank 3 and the feed pump M2. The magnetic valve Y5 also functions as a nonreturn valve, to prevent water from flowing back into the tank 3. This arrangement makes it possible to operate the feed pump M2 only when necessary, i.e. when the pressure at the output side of the pressure-generating apparatus 2 falls below the specified minimum or when water is drawn from the pressure-generating apparatus 2.

When needed, water flows out of the pressure-generating apparatus 2 into the coffee machine 1 and/or into other devices, e.g. accessories of the coffee machine 1 such as chocolate-drink devices or hot-water devices, indicated by "n".

SUMMARY

The object of the present invention is to provide a beverage preparer, in particular a coffee machine, of the kind described at the outset that with the minimum possible technical complexity is independent of the magnitude of the liquid pressure available at the input of the beverage preparer.

According to a central concept of the invention, the pressure-raising stage is connected at its output side to the input of the second beverage region by way of a pressure reducer. Thus the liquid pressure needed for the operation of the second beverage region can be made available by the pressure-raising stage. The pressure-raising stage is, for example, a pressure pump. However, if the liquid pressure available at the input of the beverage preparer is sufficient for the operation of the second beverage region without operation of the pressure-raising stage, it is possible to operate the second beverage region in a manner similar to the operation of the first beverage region without the use of the pressure pump M1 of the known coffee machine 1 (see above).

The beverage preparer further comprises a pipe connection from the input of the second beverage region to an input of the first beverage region, which can be closed off by a switch according to the mode of operation. By this means, depending on the state of the operating-mode switch apparatus, either the first or the second liquid pressure prevails in the first beverage region. Accordingly, for example, either pressurized coffee-or brewed coffee can be prepared in the first beverage region.

It is a substantial advantage of the invention that the same pressure-raising stage can be employed to provide the first and the second liquid pressure in the first beverage region. When the first beverage region is in operation, therefore, depending on the desired mode of operation either the liquid flows directly from the pressure-raising stage to the first beverage region, or there is an indirect flow of liquid from the pressure-raising stage through the pressure reducer, the entrance to the second beverage region and the entrance to the first beverage region, into the first beverage region.

This arrangement requires less diversity of components in the beverage preparer. The associated space requirement is also slight. For example, it is not necessary to generate various liquid pressures with different pressure pumps, or to use a pressure pump with controllable rotation rate. Such pressure pumps with controllable rotation rate demand a relatively complex control logic and are comparatively expensive to manufacture. It is also possible to do without an external pressure-raising apparatus at the input, because the pressure-raising stage provides the particular liquid pressure needed by each of the connected beverage regions.

The beverage preparer is furthermore independent of the liquid pressure available at its input connection. Even if suction is needed to draw in the liquid, the beverage preparer can operate reliably.

In a further development the operation-mode switch apparatus comprises a three-way valve, which is disposed at the entrance to the first beverage region and at its input side is connected to the output of the pressure-raising stage both directly and indirectly by way of the entrance to the second beverage region and by way of the pressure reducer. Even though additional switching elements, such as switching valves, can be provided as part of the operation-mode switch apparatus, the three-way valve suffices completely to adjust the liquid pressure in the first beverage region to the desired level. The three-way valve is preferably actuated by way of an electronic controller. If apart from the three-way valve no other switching elements are present in the operation-mode switch apparatus that can influence the flow of liquid into the first beverage region, it is possible to choose whether the first input of the three-way valve, which is connected directly to the pressure-raising stage, or the second input of the three-way valve, which is indirectly connected to the pressure-raising stage by way of the entrance to the second beverage region, is opened when liquid should flow into the first beverage region or a particular static pressure should prevail in the first beverage region. To close off the first beverage region, in particular when exclusively the second beverage region and/or other beverage regions are to be supplied with liquid, both inputs of the three-way valve are closed, or the output of the three-way valve is closed.

Alternatively, the operation-mode switch apparatus comprises two separate switching valves, the first being disposed at a direct connection between the pressure-raising stage and the input of the first beverage region while the second switching valve is disposed at the indirect connection joining the pressure-raising stage to the input of the second beverage region and continuing from there to the input of the first beverage region. By this means the same switching possibilities are provided that were described above for the alternative embodiment with the three-way valve.

In a further development the second switching valve is disposed between the input of the second beverage region and the input of the first beverage region.

In one embodiment an additional or one only switching valve is disposed between the output of the pressure-raising stage and the input of the second beverage region.

The switching valve thus, when in the closed position, blocks both a flow of liquid through the indirect connection into the first beverage region and a flow of liquid into the second beverage region.

In a preferred further development the input of the second beverage region is connected to an input of one or several additional beverage regions. In particular, the additional input or at least one of the additional inputs is positioned at an input connection of an external accessory device, for example a chocolate-drink device.

BRIEF DESCRIPTION OF THE DRAWINGS

In the following the invention is explained with reference to the drawing. Although exemplary embodiments are described, the invention is not limited to these. The individual figures of the drawing show.

DETAILED DESCRIPTION

Figure 1:
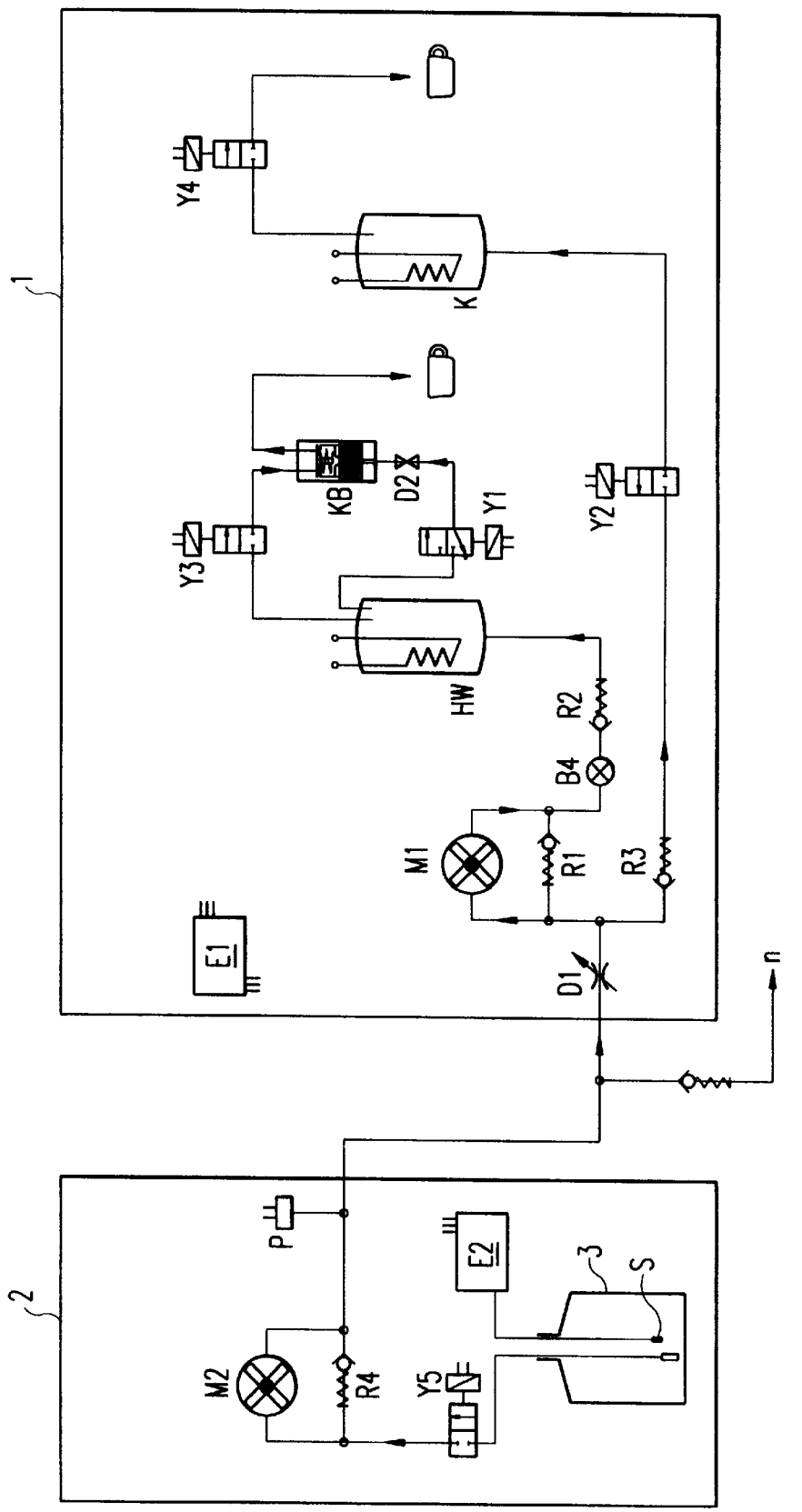
FIG. 1 a coffee machine according to the state of the art.

The coffee machine 11 in accordance with the invention is similar in a number of structural respects to the coffee machine 1 according to the state of the art, as described above with reference to FIG. 1. For instance, at the output side of the pressure pump M11 of the coffee machine 11, as in the known coffee machine 1, there is connected a first beverage region for the preparation of coffee, which is identical in structure to the first beverage region of the coffee machine 1. Furthermore, a second beverage region of identical structure for the preparation of hot water is present in both coffee machines 1; 11. In distinction to the state of the art, however, the second beverage region of the coffee machine 11 is likewise connected to the output side of the pressure pump M11.

Figure 2:
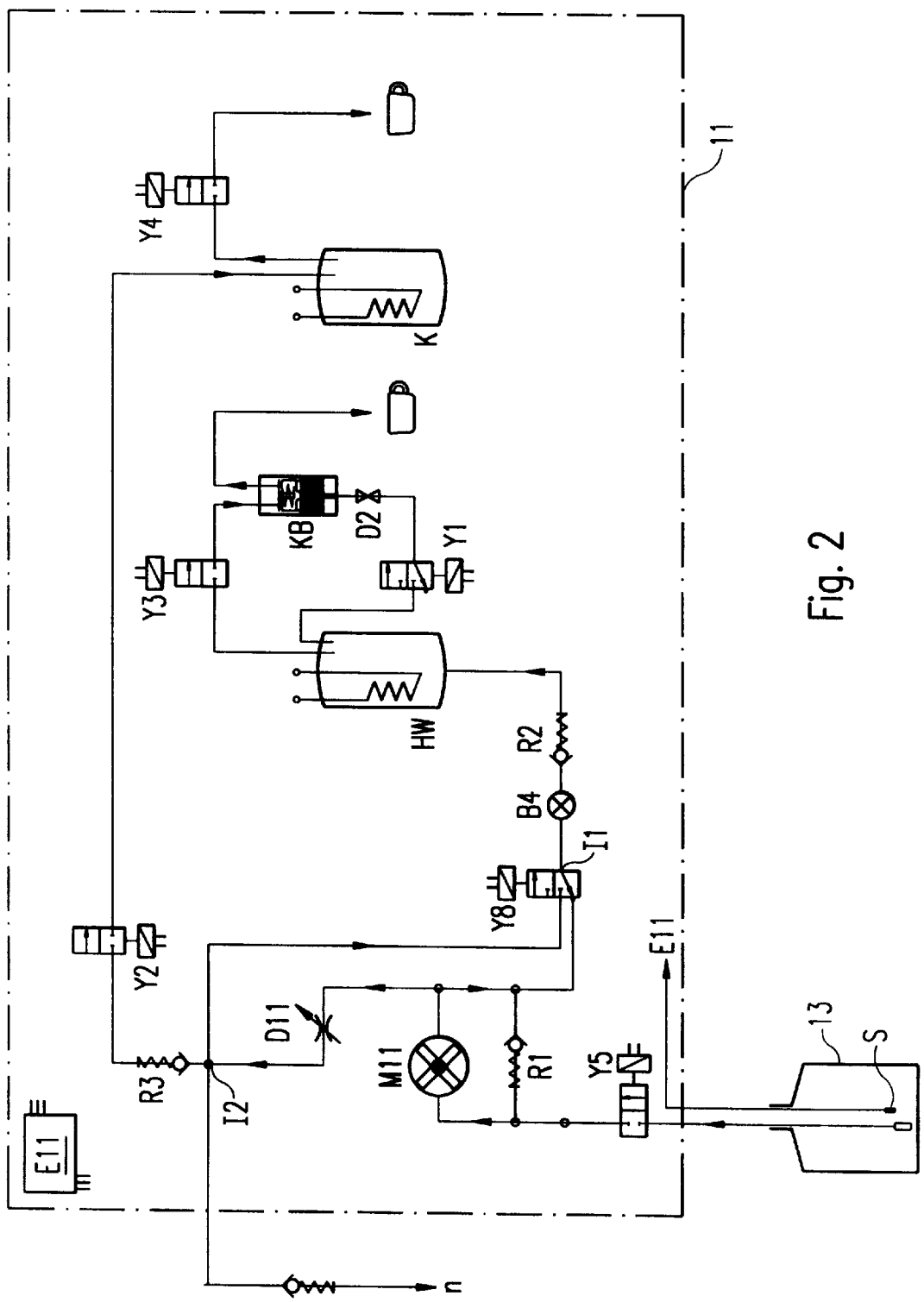
FIG. 2 a coffee machine in accordance with the invention.

Between the output of the pressure pump M11 and the nonreturn valve R3 of the second beverage region there is provided, as can be seen in FIG. 2, a pressure reducer D11, which is set to a specified output pressure, in particular about maximally 2 bar. Furthermore, between the output of the pressure reducer D11 and the nonreturn valve R3 a branch is provided for the diversion of liquid to external devices, indicated by "n". The external devices n can in turn be accessory devices such as chocolate-drink or hot-water devices.

In accordance with the invention the output of the pressure pump M11 is connected by way of the pressure reducer D11 and by way of a pipe to the input I1 of the first beverage region. There a three-way valve Y8 is disposed, which either closes off both pipes at its input side from the first beverage region or connects one or the other of the input-sided pipes to the first beverage region.

The intersection point, at which from the pipe connecting the pressure pump M11 to the second beverage region there branch off the pipes leading to the external devices n and to the first beverage region, in this case constitutes the input I2 of the second beverage region. In general, however, the input is defined merely by the branch leading to the first beverage region. In that case an additional branch for the external devices n can be situated downstream in the second beverage region.

The coffee machine 11 operates as follows.

In the first operation mode the first input of the three-way valve Y8, which represents the operation-mode switch apparatus, is opened. The pressure pump M11 produces at its output side a liquid pressure which in particular is greater than 8 bar. This liquid pressure can be used on one hand to prepare pressurized coffee in the first beverage region and on the other hand to provide liquid for the second beverage region (e.g., hot water) and for the external devices n, although in the second beverage region and for the external devices n the liquid is available only at the lower pressure to which the pressure reducer D11 is set. The second input of the three-way valve Y8 is closed in the first operation mode.

In the second operation mode the first input of the three-way valve Y8 is closed, while the second input of the three-way valve Y8 is opened. The pressure pump M11 is operated with about the same pressure-raising performance as in the first mode of operation. Because of the pressure-reducing action of the pressure reducer D11, however, at the output side of the three-way valve there is a second, lower liquid pressure than in the first operating mode. To relieve the load on the pressure pump M11 it can be temporarily turned off if in the first beverage region the flowing liquid does not fall below the minimal pressure necessary in the second operation mode. In addition to the preparation of brewed coffee in the first beverage region, the second beverage region and/or the accessory devices n can be operated.

The electronic controller E11 is responsible for all aspects of controlling the operation of the coffee machine 11. In particular, it controls the three-way valve Y8 and the boiler valve Y2 at the entrance to the second beverage region.

In the coffee machine 11 shown in FIG. 2, the liquid is conveyed out of a water tank 13 through the pressure pump M11. In order to prevent backflow into the water tank 13, there is provided in the coffee machine 11 a magnetic valve Y5 that can be actuated by the electronic controller E11 and that has a nonreturn function. Furthermore, a sensor S in the water tank is electrically connected to the electronic controller E11, so that the water level in the tank 13 can be monitored. The coffee machine 11 shown in FIG. 2 operates without any external, input-sided liquid pressure. Instead, the pressure pump M11 draws the liquid out of the water tank 13 by suction.

In the case of alternative embodiments of the coffee machine 11, however, or alternative ways of arranging its connections, the coffee machine 11 can also be connected to a liquid mains supply with a liquid pressure. The pressure of the liquid in the mains may be very slight or even high enough to reach the second liquid pressure needed for the second mode of operation. For this case, in a further development the coffee machine 11 is provided with an input-sided pressure sensor (not shown) that is connected to the electronic controller E11. If the input-sided liquid pressure at least temporarily suffices for the second mode of operation, the coffee machine 11 in accordance with the invention can be operated like the coffee machine 1 according to the state of the art, in that the liquid flows through the inactivated pressure pump M11. A substantial advantage of the coffee machine 11 in accordance with the invention, however, is that the pressure pump M11 can be put into operation immediately when the input-sided liquid pressure no longer suffices for operation without the pressure pump M11.

Furthermore, the coffee machine 11 can also be connected to a supply tank that provides liquid with a hydrostatic fluid pressure; that is, the water supply is disposed at a higher level than the coffee machine 11. The coffee machine 11 is thus universal, being employable and operable regardless of the input-sided liquid pressure. Hence it is particularly suitable for use in countries in which water is customarily supplied both from water tanks and by way of a mains pipeline system.

| List of reference numerals | |
|---|---|
| 1 | Coffee machine |
| 2 | Pressure-generating apparatus |
| 3 | Water tank |
| 11 | Coffee machine |
| 13 | Water tank |
| B4 | Flow meter |
| D1 | Pressure reducer |
| D2 | Resistance to flow |
| D3 | Resistance to flow |
| E1 | Electronic controller |
| E2 | Control mechanism |
| E11 | Electronic controller |
| HW | Water heater |
| I1 | Entrance to the first beverage region |
| I2 | Entrance to the second beverage region |
| K | Water boiler |
| KB | Coffee-preparation unit |
| M1 | Pressure pump |
| M2 | Feed pump |
| M11 | Pressure pump |
| P | Pressure regulator |
| R1 | Nonreturn valve |
| R2 | Nonreturn valve |
| R3 | Nonreturn valve |
| R4 | Nonreturn valve |
| S | Water sensor |
| Y1 | Infusion valve |
| Y2 | Boiler valve |
| Y3 | Admixture valve |
| Y4 | Hot-water valve |
| Y5 | Magnetic valve |
| Y8 | Three-way valve |
| n | External devices |

What is claimed is:

1. A beverage preparer comprising:

a first beverage preparation means for the preparation of a first beverage, a second beverage preparation means for the preparation of a second beverage, a pressure-raising means for raising the pressure of water supplied thereto to a first liquid pressure, said pressure-raising means including an inlet that receives the water and an outlet that outputs water at the first liquid pressure, and wherein the outlet of said pressure-raising means is connected to an input of the second beverage preparation means through a pressure reducer that is capable of reducing the first liquid pressure to a second lower liquid pressure, and wherein the outlet of said pressure-raising means is connected to an input of the first beverage preparation means through a valve that can be blocked in such a way that, depending on an operating state of the valve, either the first liquid pressure or a second liquid pressure prevails.

2. The beverage preparer according to claim 1, wherein the valve comprises a three-way valve that is disposed at the input of the first beverage preparation means, the three-way valve including an input side that is connected to the outlet of the pressure-raising means.

3. The beverage preparer according to claim 1, wherein the valve comprises two separate switching valves, the first switching valve being disposed at a direct connection between the pressure-raising means and the input of the first beverage preparation means while the second switching valve is disposed at an indirect connection that passes from the pressure-raising means to the input of the second beverage preparation means and continues from there to the input of the first beverage preparation means.

4. The beverage preparer according to claim 3, wherein the second switching valve is disposed between the input of the second beverage preparation means and the input of the first beverage preperation means.

5. The beverage preparer according to claim 1, wherein the input of the second beverage preparation means is connected to an input of at least one additional beverage preparation means.

* * * * *